May 17, 1949.  J. D. LEE  2,470,254

INSIDE THREAD CALIPER

Filed May 21, 1946

*INVENTOR.*
JOHN D. LEE
BY
ATTORNEY

Patented May 17, 1949

2,470,254

UNITED STATES PATENT OFFICE 2,470,254

INSIDE THREAD CALIPER

John D. Lee, Redondo Beach, Calif.

Application May 21, 1946, Serial No. 671,159

2 Claims. (Cl. 33—163)

This invention relates to an inside thread caliper.

One object of the invention is to provide a caliper for use in measuring diameters of holes having inside threads. Another object is to provide a caliper for measuring diameters at the bottom of inside thread grooves in cylindrical cavities. Another object is to provide inside calipers which may be contracted to remove from a hole after calipering. These and other objects are attained by my invention which will be understood from the following description reference being made to the accompanying drawing in which.

Figure 1:
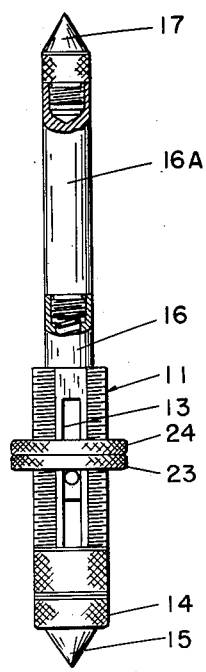
Fig. 1 is a side elevational view showing the method of using my caliper in a large threaded hole.
Figure 2:
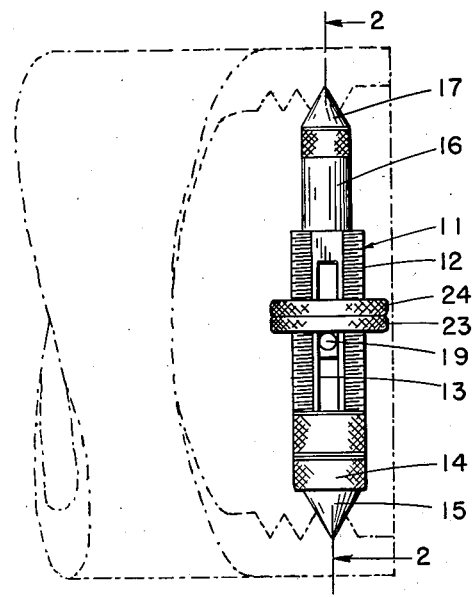
Fig. 2 is a cross-sectional view taken on the line 2—2 of Fig. 1.
Figure 3:
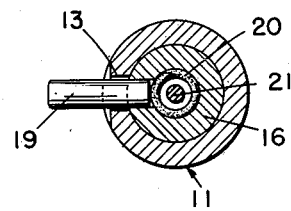
Fig. 3 is a cross-sectional view taken on the line 3—3 of Fig. 2.
Figure 4:
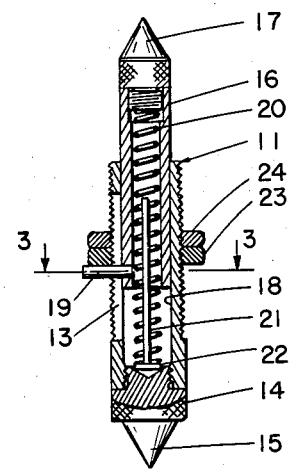
Fig. 4 is a side elevational view partly in section showing my device with an extension piece adapted for use in measuring larger sized holes.

Referring to the drawings, my device consists of a cylindrical body 11 having outside threads 12 extending over the greater portion of its length and also having a longitudinal slot 13 extending for substantially the length of the threaded portion except short bridging portions near the ends. A cap 14 is threaded at one end for attachment to the cylindrical body 11 and has at its other end a hardened steel point 15 adapted to go between the internal threads of the hole to be measured so that its point touches the bottom of the thread grooves. The cylindrical body 11 is provided at one end with internal threads to which the cap 14 is threadedly engaged, the remainder of the body 11 having a smooth cylindrical hole 18 adapted to enclose the plunger 16 which is also provided with an outside hardened steel point 17. The hardened steel points are preferably conical with an angle of not over 55° so that they will go into the thread grooves. The plunger 16 is provided with a laterally extending pin 19 near the inside end of the plunger and adapted to extend through the slot 13 in the body. A coil spring 20 is provided in the hole 18 extending toward the cap 14. A centering pin 21 having a head 22 abutting the inner surface of the cap 14 is provided in order to hold the plunger outwardly as far as permitted by the position of the pin 19 in the slot 13, this position being fixed by the adjusting nut 23 operating on the outside threads 12 of the body 11. A locking nut 24 for the adjusting nut 23 is conveniently provided in order to lock the position of said adjusting nut.

The manner of using my tool will be apparent, particularly by reference to Fig. 1. The tool is inserted in the hole with the point 17 on the moveable plunger being contracted either by hand or by movement of the adjusting nut 23 so that it clears the tops of the threads. The opposite points 15 and 17 are then placed in the grooves on opposite sides of the hole and the adjusting nut 23 turned until the "feel" indicates proper contact with the bottoms of the threads by the two points. The locking nut 24 is then tightened against the adjusting nut and the plunger is retracted against the spring by the fingers to release the instrument from the threads, and after removal from the cavity, the plunger allowed to return to its calipering position fixed by the contact of the pin 19 with the side of the adjusting nut 23. Measurement is then made by means of suitable micrometers or other measuring instruments between the points 15 and 17 to give the diameter of the hole at the bottom of the threads.

Extension pieces 16A may be attached to the plunger 16 in order to extend the usefulness of the instrument to diameters greater than those which are reached by the tool using the short cap.

The instrument may also be used in cutting a thread groove inside a cavity, to fit a particular screw.

The advantages of my device are in its simple and rugged construction and in the accuracy with which the instrument may be adjusted while in contact with the thread grooves and the accuracy with which it may be removed and taken out of the hole for subsequent measurement with a micrometer.

I claim:

1. An inside thread caliper consisting of an elongated tubular body having an outside threaded portion, said body having a closure member at one end including a pointed member extending outwardly, said body having an elongated slot in its threaded portion parallel to the axis thereof, a spring-pressed plunger in said tubular body protruding from the open end of said body, said plunger having a pointed member at its outward end, a stop pin protruding laterally from the side wall of said plunger extending through said slot in said body, and an adjusting nut threaded on said threaded body portion adapted to engage said stop pin to fix the distance between said pointed members.

2. An inside thread caliper consisting of an elongated tubular body having an outside threaded portion, said body having a closure member at one end including a pointed member extending outwardly, said body having an elongated slot in its threaded portion parallel to the axis thereof, a spring-pressed plunger in said tubular body protruding from the open end of said body, said plunger having a pointed member at its outward end, a stop pin protruding laterally from the side wall of said plunger extending through said slot in said body, an adjusting nut threaded on said threaded body portion adapted to engage said stop pin to fix the distance between said pointed members, and a lock nut also threaded on said threaded body portion.

JOHN D. LEE.

REFERENCES CITED

The following references are of record in the file of this patent:

UNITED STATES PATENTS

| Number | Name | Date |
|---|---|---|
| 129,536 | Cross | July 16, 1872 |
| 2,287,097 | Graham | June 23, 1942 |